United States Patent [19]

Shimaoka et al.

[11] Patent Number: 4,613,917
[45] Date of Patent: Sep. 23, 1986

[54] RECORDING AND REPRODUCING DEVICE

[75] Inventors: Motohiro Shimaoka; Yukio Saito, both of Furukawa, Japan

[73] Assignee: Alps Electric Co., Ltd., Japan

[21] Appl. No.: 564,837

[22] Filed: Dec. 23, 1983

[30] Foreign Application Priority Data

Dec. 23, 1982 [JP] Japan .......................... 57-193960[U]

[51] Int. Cl.4 ............................................ G11B 5/012
[52] U.S. Cl. .................................................... 360/97
[58] Field of Search ...................... 360/97, 98, 99, 133, 360/135, 86; 206/444; 346/137; 242/197, 198, 199, 200

[56] References Cited

U.S. PATENT DOCUMENTS

| | | | |
|---|---|---|---|
| 4,045,821 | 8/1977 | Fujikura | 360/132 |
| 4,120,012 | 10/1978 | Bowers | 360/133 |
| 4,320,430 | 3/1982 | Vogt | 360/86 |
| 4,358,801 | 11/1982 | Faber | 360/97 |
| 4,419,703 | 12/1983 | Gruczelak | 360/97 |
| 4,445,157 | 4/1984 | Takahashi | 360/133 |
| 4,466,032 | 8/1984 | Saito | 360/97 |
| 4,525,758 | 6/1985 | Nakagawa | 360/133 |

Primary Examiner—A. J. Heinz
Attorney, Agent, or Firm—Guy W. Shoup

[57] ABSTRACT

A recording and reproducing device records and reproduces signals in and from a disk cartridge having slots defined in lateral edges thereof and housing a magnetic disk, a magnetic head insertion hole, a shutter for opening and closing the magnetic head insertion hole, a shutter actuator projection slidably disposed in one of the grooves defined for actuating the shutter. The recording and reproducing device comprises a frame having a cartridge insertion hole for the insertion therein of the disk cartridge, opening and closing actuator projections held in resilient contact with the bottoms of the grooves, respectively, for actuating the shutter actuator projection in engagement therewith while the disk cartridge is inserted through the cartridge insertion hole into the frame, and stopper members disposed laterally of the opening and closing projections for preventing the latter from being laterally displaced beyond a distance smaller than the length of projection of the shutter actuator projection.

4 Claims, 5 Drawing Figures

RECORDING AND REPRODUCING DEVICE

BACKGROUND OF THE INVENTION

The present invention relates to a recording and reproducing device for recording and reproducing signals in and from disk cartridges.

There have in recent years been developed disk cartridges comprising a cartridge made of hard material and a magnetic disk rotatably housed in the cartridge, the cartridge having a magnetic disk insertion slot and a shutter for opening and closing the insertion slot. When the disk cartridge is inserted into a cartridge insertion hole defined in a frame of a recording and reproducing device, the shutter is actuated in response to coaction between an opening and closing projection disposed in the recording and reproducing device and a shutter actuator projection in the disk cartridge for thereby opening the magnetic head insertion slot to allow recording and reproducing operations. When the disk cartridge is not in use, the magnetic head insertion slot is closed by the shutter to prevent dust or other foreign matter from entering the disk cartridge and adversely affecting future recording and reproducing operations.

However, there is a tendency of the shutter actuator projection to fail to engage the opening and closing projection sufficiently due to various outer dimensions of disk cartridges, dimensional errors and wear of the shutter actuator projection. This prevents the shutter from opening when the disk cartridge is loaded into the recording and reproducing device. Therefore, no recording and reproducing operation is possible, and a tip end of the magnetic head engages the shutter.

SUMMARY OF THE INVENTION

It is an object of the present invention to provide a recording and reproducing device which will eliminate the drawbacks with the prior art and is capable of properly opening and closing a shutter in a disk cartridge inserted in the recording and reproducing device.

According to the present invention, there is provided a recording and reproducing device for recording and reproducing signals in and from a disk cartridge having slots defined in lateral edges thereof and housing a magnetic disk, a magnetic head insertion hole, a shutter for opening and closing the magnetic head insertion hole, a shutter actuator projection slidably disposed in one of the grooves defined for actuating the shutter. The recording and reproducing device comprises a frame having a cartridge insertion hole for the insertion therein of the disk cartridge, opening and closing actuator projections held in resilient contact with the bottoms of the grooves, respectively, for actuating the shutter actuator projection in engagement therewith while the disk cartridge is inserted through the cartridge insertion hole into the frame, and stopper members disposed laterally of the opening and closing projections for preventing the latter from being laterally disposed beyond a distance smaller than the length of projection of the shutter actuator projection.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
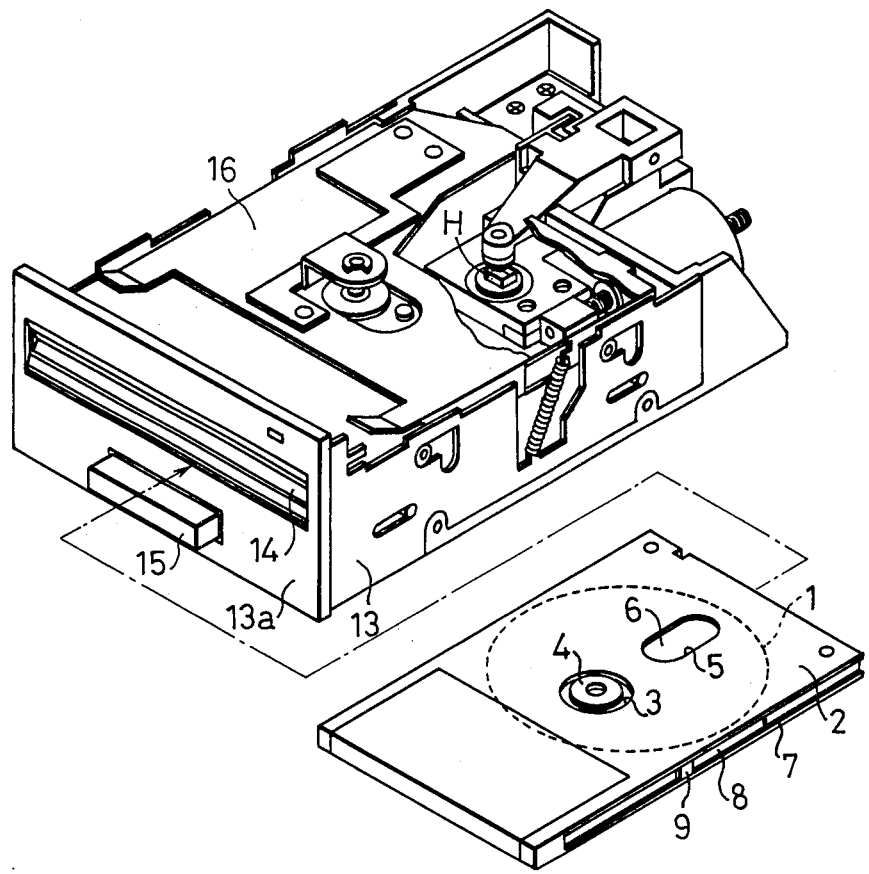
FIG. 1 is a perspective view of a recording and reproducing device according to the present invention, and a disk cartridge for use therewith.
Figure 3:
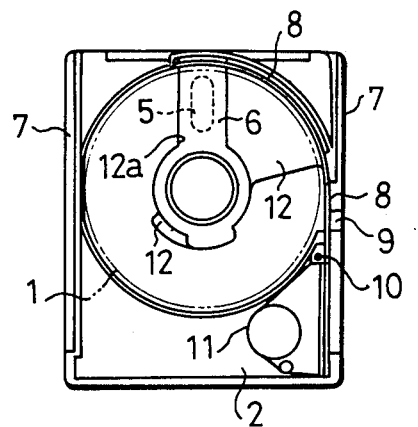
FIG. 3 is a plan view showing the interior of a disk cartridge.

As shown in FIGS. 1 and 3, a magnetic disk 1 is rotatably housed in a disk cartridge 2 made of hard synthetic resin. A hub 4 by which the magnetic disk 1 is centrally sandwiched projects through a central hole 3 defined in the disk cartridge 2. The disk cartridge 2 has a magnetic head insertion slot 5 below which there is disposed an angularly movable shutter 6 in the form of a metal plate. The disk cartridge 2 has grooves 7 defined in opposite side edges, and a shutter actuator projection 9 at an end of a flexible web 8 of synthetic resin is slidably disposed in one of the grooves 7. The other end of the flexible web 8 is connected to an upper end of the shutter 6. The flexible web 8 is normally urged counterclockwise by a spiral spring 11 having one end engaging a spring support 10 mounted on the lower end of the shutter actuator 9, thereby resiliently biasing the shutter 6 normally in a direction to close the magnetic head insertion slot 5. The disk cartridge 2 also has a recess 12 for limiting the angular movement of the shutter 6 to a certain range. The shutter 6 closes the magnetic head insertion slot 5 when in a position 12a in the recess 12.

Figure 2:
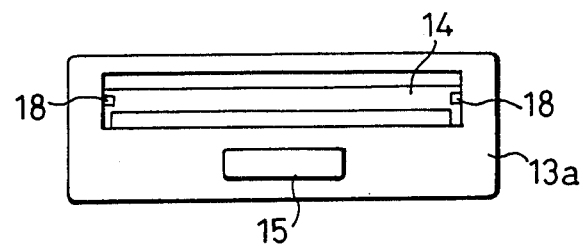
FIG. 2 is a front elevational view of the recording and reproducing device shown in FIG. 1.
Figure 5:
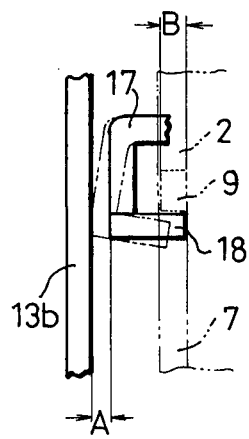
FIG. 5 is an enlarged fragmentary plan view of a portion of the recording and reproducing device.

As shown in FIG. 1, a recording and reproducing device has a magnetic head H insertable into the magnetic head insertion slot 5. The recording and reproducing device also includes a frame 13 having a front frame member 13a (FIGS. 1 and 2) defining therein a cartridge insertion hole 14 and having an eject button 15. A cartridge holder 16 is movably disposed behind the cartridge insertion hole 14. The frame 13 includes a resilient frame member 17 of synthetic resin disposed in front of the cartridge insertion hole 14 and having a pair of opening and closing projections 18 projecting inwardly into the frame 13 from opposite ends of the resilient frame member 17, the opening and closing projections 18 being engageable with the shutter actuator projection 9. The opening and closing projections 18 have distal ends held in resilient contact with the bottoms of the grooves 7 for reliable engagement with the shutter actuator projection 9 in the corresponding groove 7. The frame 13 includes side frame members 13b serving as stopper members and disposed laterally of the resilient frame member 17. When the opening and closing projections 18 are pressed by the shutter actuator projection 9 to move outwardly, they are prevented from moving outwardly by the side frame members 13b beyond a distance A (FIG. 5). The gaps or spaces between the opening and closing projections 18 and the side frame members 18b is selected such that the distance A is smaller than the length B of projection of the shutter actuator projection 9.

Figure 4:
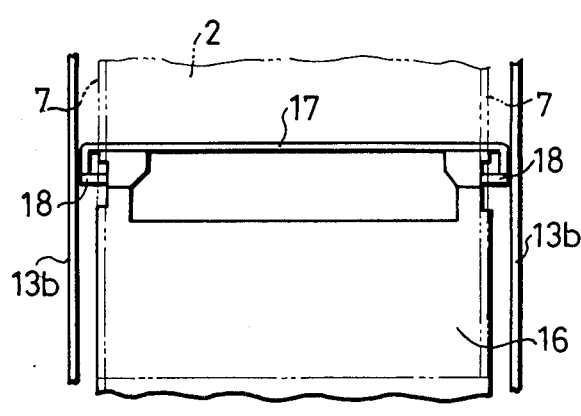
FIG. 4 is a fragmentary plan view of a portion of the recording and reproducing device.

In operation, the disk cartridge 2 is inserted into the disk cartridge hole 14. Where the shutter actuator projection 9 is worn or its length of projection is smaller than normal due to dimensional errors, the opening and closing projections 18 remain resiliently seated in the grooves 7, respectively, for reliable engagement with the shutter actuator projection 9, as shown in FIG. 4. Even when the opening and closing projection 18 is forced by the shutter actuator projection 9 to move in a direction out of the groove 7, the opening and closing projection 18 is prevented by the corresponding stopper member 18b from being displaced out of engagement with the shutter actuator projection 9. Accordingly, the opening and closing projection 18 is engageable with the shutter actuator projection 9 without fail.

Upon engagement between the shutter actuator 9 and the corresponding opening and closing actuator 18, the disk cartridge 2 is inserted into the cartridge holder 16 to enable the opening and closing actuator 18 to slide in and along the corresponding groove 7 against the bias of the spiral spring 11. The shutter 6 connected by the flexible web 8 to the shutter actuator 9 is then turned clockwise to open the magnetic head insertion slot 5 for readying the recording and reproducing device for recording and reproducing modes.

After recording or reproducing operation, the disk cartridge 2 is pulled out of the cartridge insertion hole 14 to cause the shutter actuator 9 to disengage from the corresponding opening and closing actuator 18. The shutter actuator 9 and the flexible web 8 now return to their original position under the resilient force of the spiral spring 11, and the shutter 6 turns counterclockwise to the position 12a in the recess 12, thus closing the magnetic head insertion slot 5 again.

With the foregoing arrangement of the invention, the opening and closing projections are resiliently seated in the respective grooves in the disk cartridge at all times so that the shutter actuator projection will engage the corresponding opening and closing projection at all times. Even when the opening and closing projection is subjected to a force tending to displace the same out of the corresponding groove, the opening and closing projection is positioned by the stopper member in engagement with the shutter actuator projection. Consequently, the shutter can reliably be opened and closed for enabling the recording and reproducing device to effect recording and reproducing operation under proper conditions at all times. The recording and reproducing device is therefore highly reliable in operation.

Although a certain preferred embodiment has been shown and described, it should be understood that many changes and modifications may be made therein without departing from the scope of the appended claims.

What is claimed is:

1. In a recording and reproducing device for a magnetic disk cartridge of the type having a frame, a cartridge insertion hole in said frame for insertion of a disk cartridge in a longitudinal direction therein, and an opening and closing projection disposed within said frame for engaging a shutter actuator projection disposed on the outside of disk cartridge for opening and closing a shutter of a magnetic head insertion hole formed in the cartridge, the improvement comprising:
the disk cartridge having a groove defined in an exterior facing lateral edge extending along the longitudinal direction thereof, and said shutter actuator projection being longitudinally slidably disposed in said groove and projecting a first distance from a bottom portion of said groove in a direction transverse to said longitudinal direction of the disk cartridge;
said opening and closing projection being mounted in said frame for resilient contact with said bottom portion of said groove and extending in the transverse direction into the path of said shutter actuator projection so as to engage said shutter actuator projection when the disk cartridge is inserted in said cartridge insertion hole of said frame; and
a stopper member mounted in said frame and disposed adjacent said groove for preventing said opening and closing projection from being displaced in the transverse direction beyond a second distance smaller than said first distance when engaged by said shutter actuator projection.

2. A recording and reproducing device according to claim 1, wherein said disk cartridge includes grooves in opposed lateral edges thereof, and said frame includes a resilient frame member disposed in said cartridge insertion hole, said resilient frame member including opening and closing projections projecting from opposite ends of said resilient frame member inwardly in the transverse direction of said frame.

3. A recording and reproducing device according to claim 1, wherein said frame includes a side frame member, said stopper member comprising said side frame member for preventing said opening and closing projection from moving transversely beyond said second distance.

4. A recording and reproducing device according to claim 1, wherein the shutter comprises a plate and is angularly movable.

* * * * *